US006892030B2

(12) United States Patent
Rife

(10) Patent No.: US 6,892,030 B2
(45) Date of Patent: May 10, 2005

(54) SYSTEM AND METHOD FOR EFFECTING TEMPERATURE CONTROL IN A CAMERA

(76) Inventor: John L. Rife, 154 Moonlight Dr., Murphy, Collin County, TX (US) 75094

( * ) Notice: Subject to any disclaimer, the term of this patent is extended or adjusted under 35 U.S.C. 154(b) by 21 days.

(21) Appl. No.: 10/322,129

(22) Filed: Dec. 17, 2002

(65) Prior Publication Data

US 2004/0114920 A1 Jun. 17, 2004

(51) Int. Cl.[7] .................... G03B 17/02; H04N 5/225; G02B 7/02; G01J 5/01; G01T 1/24
(52) U.S. Cl. .................. 396/535; 348/374; 359/811; 250/352; 250/370.15
(58) Field of Search ...................... 396/535, 429, 396/419, 427; 348/373, 143, 374, 372, 207.99; 219/201; 361/727, 601; 250/330–334, 336.2, 443.1, 339.03, 334.01, 338.1, 336.1, 346, 352, 370.15, 339.04, 234, 338.4, 306, 339.01; 359/642, 811

(56) References Cited

U.S. PATENT DOCUMENTS

| 4,719,353 A | * | 1/1988 | Peck, Jr. et al. ............ 250/352 |
| 4,783,593 A | * | 11/1988 | Noble ........................ 250/352 |
| 5,839,284 A | * | 11/1998 | Wyatt et al. .................. 62/3.2 |
| 6,133,569 A | | 10/2000 | Shoda et al. ................. 250/332 |
| 6,188,841 B1 | | 2/2001 | Kamata ......................... 396/6 |
| 6,441,943 B1 | * | 8/2002 | Roberts et al. ............. 359/267 |
| 6,486,473 B2 | | 11/2002 | Salapow et al. ............ 250/330 |

FOREIGN PATENT DOCUMENTS

EP           0 837 600 A2    4/1998    ............ H04N/5/33

OTHER PUBLICATIONS

U.S. Patent Application titled "*Method and Apparatus for Effecting Temperature Control in a Camera*"; U.S. Appl. No. 10/146,403 (22 pgs. Figures 1/2), May 14, 2002.
Notication of International Search Report for International Application No. PCT/US03/38351, filed Dec. 3, 2003 (6 pages), May 17, 2004.

* cited by examiner

*Primary Examiner*—Judy Nguyen
*Assistant Examiner*—Rochelle Blackman
(74) *Attorney, Agent, or Firm*—O'Keefe, Egan & Peterman, LLP

(57) ABSTRACT

According to an embodiment of the present invention, a system for effecting temperature control in a camera includes a lens housing having an optical stop, a lens disposed within the lens housing, and a thermally conductive material disposed between the lens and the optical stop. The thermally conductive material, which may be an adhesive, has a thermal conductivity of at least approximately 1.90 W/m·K.

21 Claims, 2 Drawing Sheets

SYSTEM AND METHOD FOR EFFECTING TEMPERATURE CONTROL IN A CAMERA

TECHNICAL FIELD OF THE INVENTION

This invention relates in general to cameras used in hot and/or cold environments and, more particularly, to a system and method for effecting temperature control in a camera.

BACKGROUND OF THE INVENTION

Cameras are sometimes utilized in high-temperature environments. As one example, infrared imaging cameras are used by firemen in burning buildings. Typically, a fireman takes such a camera into a burning building and uses it to look for thermal patterns that indicate the presence of a person, a hot spot which may be the source of the fire, or some other thermal characteristic of interest.

Early infrared-imaging cameras were fairly large and complex. The incoming infrared radiation typically passed through a rotating perforated disk called a "chopper" in order to facilitate its detection by a detector. Further, these prior cameras needed active cooling systems, typically based on thermoelectric cooling (TEC) devices, in order to maintain the lenses and/or detector at temperatures facilitating accurate and reliable operation.

More recently, infrared detectors have been developed that are capable of operation without certain support structure, such as choppers and active cooling systems. Eliminating support structure of this type is advantageous, because it reduces the size, weight, cost and power consumption of the camera. However, eliminating active cooling arrangements may lead to undesirable thermal activity within the camera that may affect its operation. For example, when a firefighter is in a very high temperature environment for approximately five minutes and then returns to a cooler environment, a circular shape may appear in the viewing screen that obscures the view for two or more minutes, which could be very dangerous to the firefighter.

SUMMARY OF THE INVENTION

According to an embodiment of the present invention, a system for effecting temperature control in a camera includes a lens housing having an optical stop, a lens disposed within the lens housing, and a thermally conductive material disposed between the lens and the optical stop. The thermally conductive material, which may be an adhesive, has a thermal conductivity of at least approximately 1.90 W/m·K.

Embodiments of the invention provide a number of technical advantages. Embodiments of the invention may include all, some, or none of these advantages. One technical advantage is that the lens of an infrared imaging camera is used as a heat sink for the optical stop when the camera moves from a high temperature environment to a cooler environment. This prevents the optical stop from being imaged as a target and, hence, prevents any blurring or other obscurity of the view screen of the camera. As a result, a firefighter may safely escape from a burning building that is typically filled with dense smoke. In one embodiment, utilizing the lens as a heat sink is facilitated by a highly thermally conductive adhesive between the lens and the optical stop. This eliminates the need for an active cooling system, which is advantageous because it reduces the size, weight, cost and power consumption of the camera.

Other technical advantages are readily apparent to one skilled in the art from the following figures, descriptions, and claims.

BRIEF DESCRIPTION OF THE DRAWINGS

A better understanding of the present invention is realized from the detailed description that follows, taken in conjunction with the accompanying drawings, in which.

DETAILED DESCRIPTION OF THE INVENTION

Figure 1:
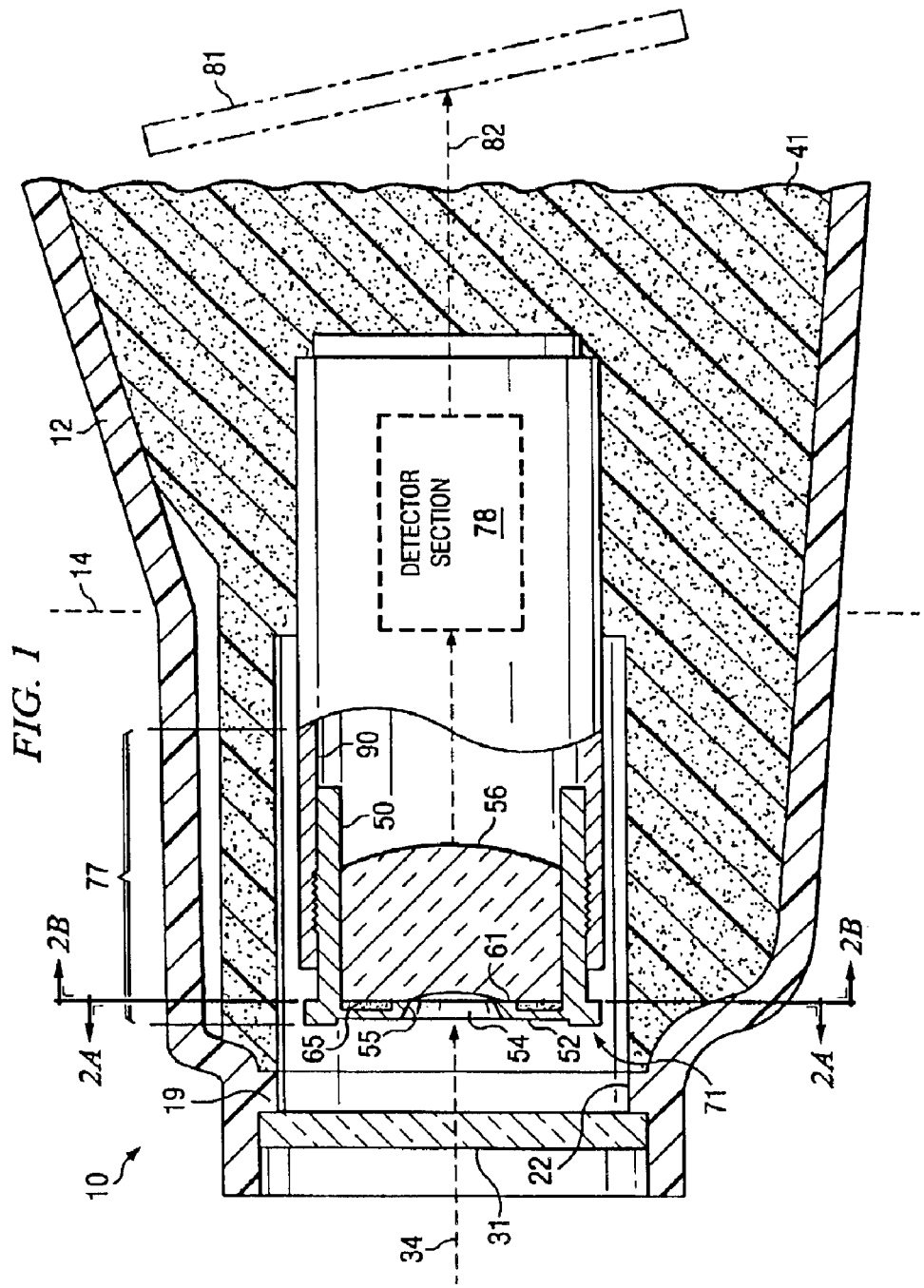
FIG. 1 is a partial cross-sectional side view of a camera that embodies aspects of the present invention.

FIG. 1 is a partial cross-sectional side view of a camera 10 that embodies aspects of the present invention. Camera 10 is any suitable camera that accepts and images infrared radiation received from a scene (not explicitly shown) at a location external to camera 10. In a particular embodiment, camera 10 is designed for use in high-temperature environments. For example, a fireman may carry camera 10 into a burning building for the purpose of trying to identify thermal patterns that may represent a person trapped within the building, a hot spot which is the source of the fire, or some other thermal pattern of interest. One example of camera 10 is a Bullard® T3 thermal imager.

In the illustrated embodiment, camera 10 includes a camera housing 12, which is formed from any suitable type of material, such as a heat-resistant plastic. A broken line 14 indicates an imaginary plane that is oriented to extend perpendicular to the plane of FIG. 1. The rear portion of camera housing 12, which is to the right of plane 14 in FIG. 1, has approximately the shape of a truncated wedge. The front portion of camera housing 12, which is to the left of plane 14, has an approximately circular cross-section. The front portion of camera housing 12 includes an annular flange 19 projecting radially inwardly. The inner edge of the flange defines a cylindrical surface 22, which serves as a circular aperture.

A window 31 in the form of a circular disk has a periphery that is disposed against the front of flange 19. In the illustrated embodiment, window 31 is made of germanium, which is transmissive to infrared (thermal) radiation, so that infrared radiation from a scene (not explicitly shown) may enter camera housing 12 through window 31 and aperture 22 along an axis or path of travel 34. Instead of germanium, window 31 could alternatively be made of some other suitable material that is transmissive to the radiation of interest. Window 31 may be coupled to camera housing 12 in any suitable manner, such as by adhesive or mechanical coupling.

A thermally insulating foam material 41 may be provided within camera housing 12. In the illustrated embodiment, foam 41 is a high-density polyurethane foam material of a known type, but it could alternatively be any other suitable material. For clarity, foam 41 is depicted in FIG. 1 as a single integral block. However, in order to facilitate fabrication and assembly, foam 41 may actually be formed as two or more physically separate portions. Foam 41 functions to thermally insulate an imaging unit 71 within camera housing 12.

Imaging unit 71 includes a lens section 77 and a detector section 78 housed in an aluminum housing 90. Briefly, infrared radiation traveling along the axis or path of travel 34 is imaged by lens section 77 onto detector section 78. Detector section 78 converts this infrared radiation into a series of successive images, and then supplies electrical signals representing these images to a liquid crystal display (LCD) 81 through not-illustrated wires that extend through foam 41 and that are indicated diagrammatically at 82. LCD 81, which in FIG. 1 is indicated diagrammatically by a broken line, may be any suitable viewing device. LCD 81 is disposed at the rear of camera 10 where it may be readily observed by a person who is holding camera 10.

In the illustrated embodiment, lens section 77 includes a lens housing 50 having an optical stop 52, and a lens 56 disposed within lens housing 50.

Figure 2A:
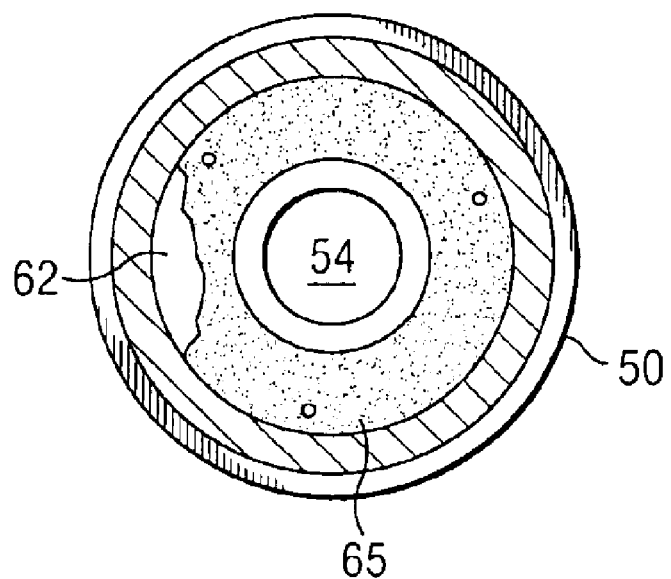
FIG. 2A is a cross-sectional view of the lens housing illustrating a thermally conductive adhesive applied to an aft surface of an optical stop in accordance with one embodiment of the present invention.
Figure 2B:
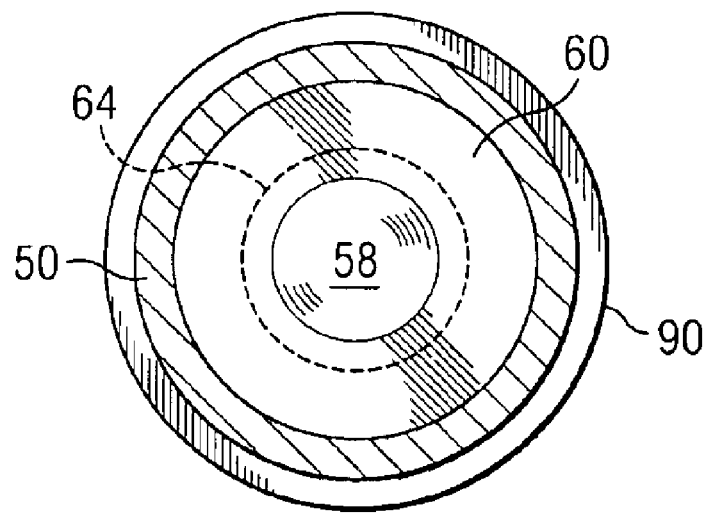
FIG. 2B is a cross-sectional view of the lens housing illustrating an annular portion and a polished portion of a lens within the lens housing in accordance with one embodiment of the present invention.

Lens housing 50, cross-sections of which are shown in FIGS. 2A and 2B, is a generally cylindrical piece of aluminum that couples to aluminum housing 90 in any suitable manner. Lens housing 50, which in other embodiments may be any suitable shape and formed from any suitable material, includes optical stop 52 that has an aperture 54 formed therein that is associated with the path of travel 34 of infrared radiation. Aperture 54 allows infrared radiation traveling along the path of travel 34 into lens 56. Aperture 54 may be any suitable diameter and is defined by tapered walls 55 formed in optical stop 52. The function optical stop 52 is to trim off unwanted radiation energy from entering aperture 54. Optical stop 52 is typically only a few millimeters thin so that the best optical performance is obtained. However because optical stop 52 is thin, it makes optical stop 52 a poor conductor.

Lens 56, which is also illustrated FIG. 2B in sectional view, is any suitable lens that is adapted to refract infrared radiation that travels into lens 56 through aperture 54 before it reaches detector section 78. In one embodiment, lens 56 is formed from germanium, which is transmissive to infrared radiation. However, lens 56 may be alternatively formed from some other suitable material that is transmissive to infrared radiation. Lens 56 has a forward surface 61 that is adjacent an aft surface 62 (FIG. 2A) of optical stop 52. Forward surface 61, as illustrated in FIG. 2B, includes an annular portion 60 and a polished portion 58 inside annular portion 60 that is adapted to receive infrared radiation through aperture 54 of optical stop 52. The diameter of polished portion 58 is slightly larger than the diameter of aperture 54 in order to eliminate edge effects. Polished portion 58 has a generally curved surface in order for the infrared radiation to be refracted when entering lens 56.

In pre-existing cameras of the type where there is no active cooling arrangement, some thermal considerations must be taken into account. One consideration exists where there is a thermal gradient between the detector and any portion of the lens and/or the lens housing. For proper operation, the lens and the lens housing, including the optical stop, should be at the same temperature as the detector, because if significant temperature differences exist, then the detector ends up detecting temperatures within the camera housing, rather than just temperatures from a scene external to the camera.

For example, when a firefighter is in a very high temperature environment for approximately five minutes and then returns to a cooler environment, a circular shape may appear in the viewing screen that obscures the view for two or more minutes, which could be very dangerous to the firefighter. This circular disk is the result of the detector detecting the optical stop as an image because the optical stop is hotter than the scene external to the camera. This disrupts operation of the camera, until the camera is removed to a cooler environment and the lens cools back down to a temperature where the lens can again properly handle infrared radiation.

Therefore, referring to FIG. 1, a thermally conductive material 65 is disposed between annular portion 60 of lens 56 and aft surface 62 of optical stop 52. Thermally conductive material 65, in one embodiment, is a thermally conductive adhesive that is adapted to couple annular portion 60 to aft surface 62; however, lens 56 may be coupled to optical stop 52 in any suitable manner. According to the teachings of one embodiment of the present invention, thermally conductive material 65 has a thermal conductivity of at least approximately 1.90 W/m·K. A thermally conductive material having this threshold of thermal conductivity allows heat to be transferred from optical stop 52 into lens 56 when camera 10 is moved from a high temperature environment to a cold temperature environment during use. This prevents optical stop 52 from being imaged as a target by detector section 78 and, hence, prevents any blurring or other obscurity of LCD 81 of camera 10. As a result, a firefighter may safely escape from a burning building that is typically filled with dense smoke. In essence, lens 56 is used as a "heat sink" for optical stop 52 when camera 10 moves from the high temperature to the cold temperature environment.

In a particular embodiment of the present invention, thermally conductive material 65 is a thermally conductive adhesive manufactured by Dow Corning, part number 1-4173. In another particular embodiment, thermally conductive material 65 is a thermally conductive adhesive manufactured by Dow Corning, part number SE-4450. Other suitable thermally conductive materials having a thermal conductivity of at least approximately 1.90 W/m·K may be utilized within the teachings of the present invention.

In one embodiment, as illustrated in FIG. 2A, thermally conductive material 65 fully extends around aft surface 62 of optical stop 52 such that thermally conductive material 65 is substantially free from voids or gaps. Avoiding voids or any other gaps within thermally conductive material 65 prevents any air from being disposed between annular portion 60 of lens 56 and aft surface 62, which facilitates adequate heat transfer from optical stop 52 into lens 56. This is because air has a much smaller thermal conductivity than thermally conductive material 65.

In another embodiment, thermally conductive material 65 fully extends around at least a smaller annular portion, as denoted by dashed line 64 in FIG. 2B, of annular portion 60 of lens 56 such that thermally conductive material 65 is substantially free from voids or gaps within smaller annular portion 64. Smaller annular portion 64 is proximate aperture 54 of optical stop 52.

Although embodiments of the invention and some of their advantages are described in detail, a person skilled in the art could make various alterations, additions, and omissions without departing from the spirit and scope of the present invention as defined by the appended claims.

What is claimed is:

1. A system for effecting temperature control in a camera, comprising:

a camera housing having a window portion through which radiation from a scene external to the camera housing can enter the camera housing and travel within the camera housing along a path of travel;

a lens housing having an optical stop disposed within the camera housing, the optical stop having an aperture formed therein that is associated with the path of travel;

a lens disposed within the lens housing, the lens having a forward surface adjacent an aft surface of the optical stop, the forward surface having an annular portion and a polished portion inside the annular portion that is adapted to receive the radiation through the aperture; and a thermally conductive material disposed between and engaging both the annular portion of the lens and the aft surface of the optical stop, the thermally conductive material having a thermal conductivity of at least approximately 1.90 W/m·K.

2. The system of claim 1, wherein the thermally conductive material comprises a thermally conductive adhesive adapted to couple the annular portion of the lens and the aft surface of the optical stop.

3. The system of claim 2, wherein the thermally conductive adhesive is part #1-4173 manufactured by Dow Corning.

4. The system of claim 2, wherein the thermally conductive adhesive is part #SE-4450 manufactured by Dow Corning.

5. The system of claim 1, wherein the thermally conductive material fully extends around at least a smaller annular portion of the annular portion of the lens such that the thermally conductive material is substantially free from voids within the smaller annular portion, the smaller annular portion proximate the aperture.

6. The system of claim 1, wherein the optical stop is formed from aluminum.

7. The system of claim 1, wherein the lens is formed from germanium.

8. A method for effecting temperature control in a camera, comprising:

providing a camera housing having a window portion transmissive to radiation;

causing radiation from a scene external to the camera housing to enter the camera housing through the window portion and travel within the housing along a path of travel;

providing a lens housing having an optical stop within the camera housing, the optical stop having an aperture formed therein;

providing a lens within the lens housing, the lens having a forward surface adjacent an aft surface of the optical stop, the forward surface having an annular portion and a polished portion inside the annular portion that is adapted to receive the radiation through the aperture; and thermally coupling the annular portion of the lens and an aft portion of the optical stop with a thermally conductive material having a thermal conductivity of at least approximately 1.90 W/m·K.

9. The method of claim 8, wherein thermally coupling the annular portion of the lens and an aft portion of the optical stop with a thermally conductive material comprises thermally coupling the annular portion of the lens and an aft portion of the optical stop with a thermally conductive adhesive.

10. The method of claim 9, wherein the thermally conductive adhesive is part #1-4173 manufactured by Dow Corning.

11. The method of claim 9, wherein the thermally conductive adhesive is part #SE-4450 manufactured by Dow Corning.

12. The method of claim 8, further comprising fully extending the thermally conductive material around at least a smaller annular portion of the annular portion of the lens such that the thermally conductive material is substantially free from voids within the smaller annular portion, the smaller annular portion proximate the aperture.

13. The method of claim 8, wherein the optical stop is formed from aluminum.

14. The method of claim 8, wherein the lens is formed from germanium.

15. A system for effecting temperature control in a camera, comprising:

a lens housing having an optical stop;

a lens disposed within the lens housing; and a thermally conductive adhesive disposed between and engaging both the lens and the optical stop, the thermally conductive adhesive having a thermal conductivity of at least approximately 1.90 W/m·K.

16. The system of claim 15, wherein the thermally conductive adhesive is part #1-4173 manufactured by Dow Corning.

17. The system of claim 15, wherein the thermally conductive adhesive is part #SE-4450 manufactured by Dow Corning.

18. The system of claim 15, wherein the thermally conductive material is disposed between an annular portion of the lens and an aft surface of the optical stop.

19. The system of claim 15, wherein the optical stop is formed from aluminum.

20. The system of claim 15, wherein the lens is formed from germanium.

21. A system for effecting temperature control in a camera, comprising:

a lens housing having an optical stop;

a lens disposed within the lens housing; and a thermally conductive material disposed between and engaging both the lens and the optical stop, the thermally conductive material having a thermal conductivity of at least approximately 1.90 W/m·K, the thermally conductive material operable to transfer heat from the optical stop into the lens so as to keep the optical stop and the lens at approximately the same temperature.

* * * * *